(12) United States Patent
Kalandyk et al.

(10) Patent No.: US 12,093,319 B2
(45) Date of Patent: Sep. 17, 2024

(54) MEASURING QUALITY OF A CHATBOT RESPONSE

(71) Applicant: INTERNATIONAL BUSINESS MACHINES CORPORATION, Armonk, NY (US)

(72) Inventors: Piotr Kalandyk, Zielonki (PL); Grzegorz Piotr Szczepanik, Cracow (PL); Hubert Kompanowski, Izbica Kujawska (PL); Agnieszka Tkaczyk-Walczak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 17/249,522

(22) Filed: Mar. 4, 2021

(65) Prior Publication Data

US 2022/0284059 A1 Sep. 8, 2022

(51) Int. Cl.
*G06F 16/9032* (2019.01)
*G06F 16/906* (2019.01)
*G06F 16/908* (2019.01)
*G06F 18/21* (2023.01)

(52) U.S. Cl.
CPC ...... *G06F 16/90332* (2019.01); *G06F 16/906* (2019.01); *G06F 16/908* (2019.01); *G06F 18/217* (2023.01)

(58) Field of Classification Search
USPC .................................................. 704/1–504
See application file for complete search history.

(56) References Cited

U.S. PATENT DOCUMENTS

| | | | | |
|---|---|---|---|---|
| 10,430,447 | B2* | 10/2019 | Canim | .................. H04L 67/306 |
| 10,572,517 | B2* | 2/2020 | Canim | ............... G06F 16/3329 |
| 10,741,176 | B2* | 8/2020 | Canim | .................. G06F 16/288 |
| 10,853,394 | B2* | 12/2020 | Kondadadi | .............. G06N 3/04 |
| 10,891,956 | B2* | 1/2021 | Canim | ................... G06F 16/219 |
| 10,909,152 | B2* | 2/2021 | Canim | .................... G10L 15/16 |
| 2019/0236204 | A1* | 8/2019 | Canim | ............... G10L 15/1815 |
| 2019/0237068 | A1* | 8/2019 | Canim | ............. G06F 16/90332 |

(Continued)

FOREIGN PATENT DOCUMENTS

WO 2019203156 A1 10/2019

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Marcus T Riley
(74) *Attorney, Agent, or Firm* — L. Jeffrey Kelly

(57) ABSTRACT

A computer-implemented method, computer system, and computer program product for measuring a quality of a chatbot response. The present invention may include receiving one or more classifications, receiving a set of questions in a chatbot to be analyzed, filtering any question from the received set of questions that is not related to an area of expertise of the chatbot, matching at least two questions from the received set of questions to each other, and applying at least one of the one or more classifications to the at least two matched questions. The one or more classifications may be based on a similarity of words and synonyms used in the at least two matched questions. The one or more classifications may be based on a similarity of intents of the at least two matched questions.

20 Claims, 5 Drawing Sheets

(56) References Cited

U.S. PATENT DOCUMENTS

| | | | | |
|---|---|---|---|---|
| 2019/0333512 A1* | 10/2019 | Canim | ............. | G10L 15/22 |
| 2019/0347326 A1* | 11/2019 | Kozhaya | ............. | G06F 40/30 |
| 2019/0384784 A1* | 12/2019 | Canim | ............. | G10L 15/1815 |
| 2020/0133966 A1* | 4/2020 | Canim | ............. | G06F 16/3329 |
| 2020/0137002 A1 | 4/2020 | Chavda | | |
| 2020/0142719 A1 | 5/2020 | Akbulut | | |
| 2020/0142997 A1* | 5/2020 | Kondadadi | ......... | G06F 16/3329 |
| 2020/0356630 A1* | 11/2020 | Silverstein | .......... | G06F 16/3329 |
| 2020/0364511 A1* | 11/2020 | Brown | ............. | G06F 16/3329 |
| 2022/0284059 A1* | 9/2022 | Kalandyk | ........... | G06F 16/3329 |

\* cited by examiner

MEASURING QUALITY OF A CHATBOT RESPONSE

BACKGROUND

The present invention relates generally to the field of computing, and more particularly to a chatbot. A chatbot may be a software application designed to conduct conversations with human correspondents in lieu of providing direct contact with a live human agent. The correspondent may type or ask a question and the chatbot will attempt to interpret the question, and then provide an answer.

BRIEF SUMMARY

Embodiments of the present invention may include a method, computer system, and computer program product for measuring the quality of a chatbot response. The present invention may include receiving one or more classifications, receiving a set of questions in a chatbot to be analyzed, filtering any question from the received set of questions that is not related to an area of expertise of the chatbot, matching at least two questions from the received set of questions to each other, and applying at least one of the one or more classifications to the at least two matched questions. The one or more classifications may be based on a similarity of words and synonyms used in the at least two matched questions. The one or more classifications may be based on a similarity of intents of the at least two matched questions. The one or more classifications may be based on a user's frustration associated with the at least two matched questions. The one or more classifications may include a classification score. The present invention may include creating metadata associated with the at least two matched questions and storing the at least two matched questions with the created metadata. The present invention may include calculating an overall accuracy of the chatbot, comparing the calculated overall accuracy of the chatbot with a predefined chatbot accuracy level, and generating an accuracy report.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
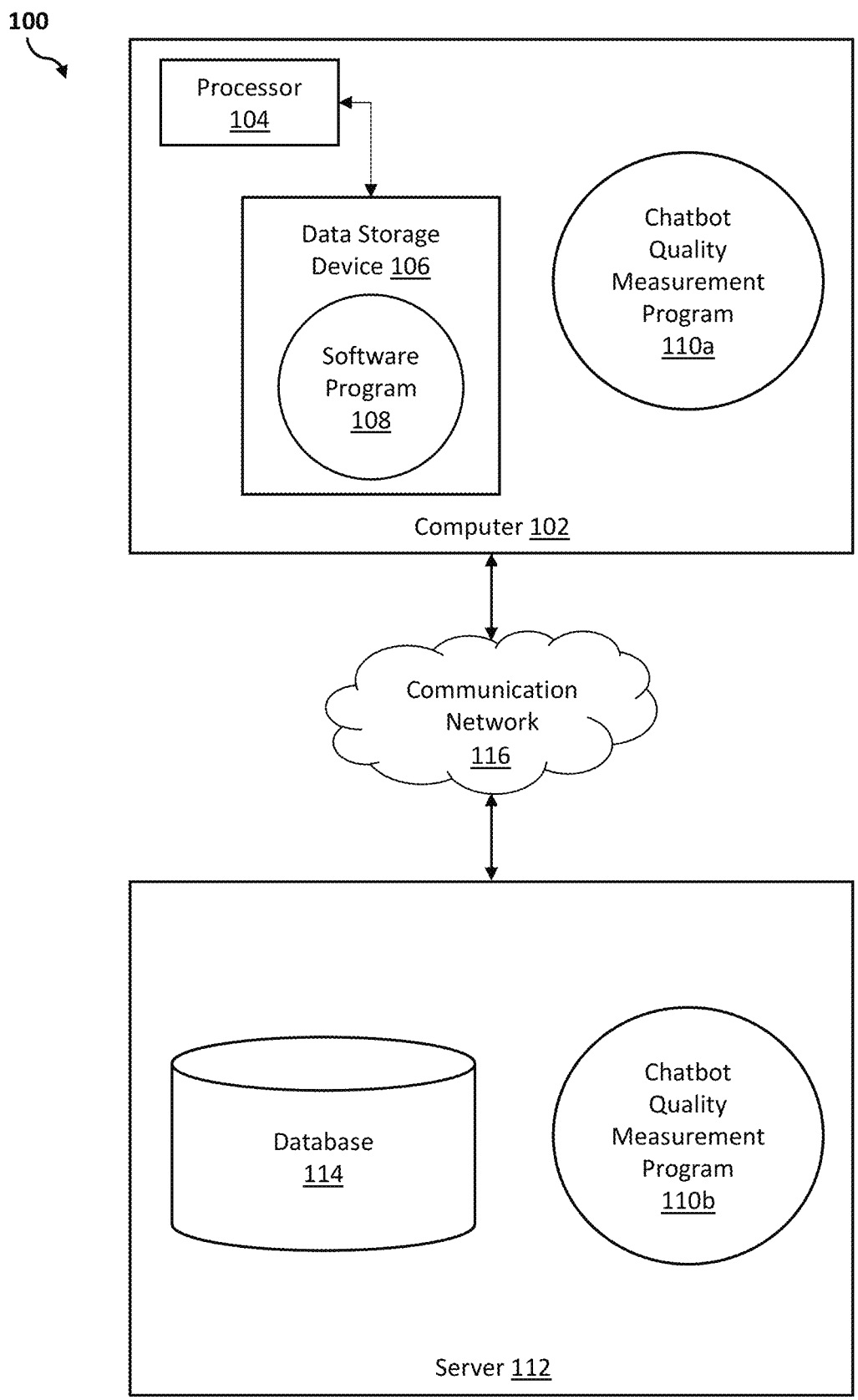
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to a chatbot. More particularly, embodiments of the present invention provide a method, computer program, and computer system for measuring a quality of a chatbot response. A chatbot may be a software application designed to conduct conversations with a user in lieu of providing direct contact with a live human agent. The user may type or ask a question and the chatbot may attempt to interpret the question, and then provide an answer.

Currently, there are many methods of measuring the quality of a chatbot response. However, these methods may take time and effort. For example, one way of measuring the quality of a chatbot response is to assess user feedback. Typically, after the user finishes interacting with the chatbot, the user is asked to fill out a questionnaire. The questionnaire may include a set of questions respecting the user's interaction with the chatbot. When properly filled out, the questionnaire is designed to provide feedback as to the accuracy of the chatbot responses to the user questions. However, this method has drawbacks. One such drawback is the dependence on the user. For example, once the user receives an answer form the chatbot, the user may quickly close the chatbot window without filling out the questionnaire. In another example, the user may get frustrated with the chatbot and may close the chatbot window without waiting for the chatbot to answer yet another question posed by the user. In yet another example, the user may provide feedback as to the quality of the chatbot responses. However, the feedback may be limited and may not be used to correctly assess the quality of a chatbot response.

Another way of measuring the quality of a chatbot responses is to utilize click tracking to count the number of user clicks during the user's interaction with the chatbot. However, click tracking is often ineffective because the user may quit the user's interaction with the chatbot before the click tracking is complete. As a result, the quality of the chatbot responses may not be measured.

Current techniques to measure the quality of the chatbot response are time consuming and are largely dependent on user feedback. Therefore, there exists a need to measure the quality of the chatbot responses automatically, without the need for user feedback or user click tracking. The following described exemplary embodiments provide a system, method, and program product for automatic measuring the quality of a chatbot response. As such, embodiments of the present invention have the capacity to improve the technical field of chatbot responses. Embodiments of the present invention do not require the user to provide feedback in order to measure the quality of the chatbot responses. Nor do the embodiments of the present invention require the number of user clicks to be tracked in order to assess whether the chatbot's responses to the questions asked were accurate. Rather, embodiments of the present invention propose reviewing chatbot interactions with the user or reviewing chatbot history logs, using algorithms and artificial intelligence (AI) models, to measure the quality of the chatbot responses.

An example of an algorithm that may be used to measure the quality of the chatbot responses is shown below.

(start)->
(QUESTION)->(ANSWER)-><decision1>not_1st->
  (end)
<decision1>->[next]-><decision2>not_similar->(end)
<decision2>->[add_points(similarity)]-><decision3> different_intent->(end)
<decision3>->[add_points(intent)]-><decision4> no_frustration->(end)
<decision4>->[add_points(frustration)]
->(end)

As stated herein above, the chatbot may be a software application designed to conduct conversations with a user in lieu of providing direct contact with a live human agent. For example, the user may start interacting with a chatbot by asking a first question. The chatbot may interpret the question and provide an answer. Subsequently, the user may either ask a second question, or may close the chatbot window, effectively ending the user's interaction with the chatbot. The user may ask a second question that may either be related or unrelated to the first question. Embodiments of the present invention may use algorithms and AI models to compare the first question with either the second question, or any other subsequent question asked by the user, and determine whether the first and the subsequent question, such as, for example, the second question, are related to each other. The determination may be based on different classifications. The classifications may include, but are not limited to, assessing the similarity of words used in the first question and the second question, comparing the intent of the first question with the intent of the second question, or measuring the frustration of the user during the user's interaction with the chatbot.

In an embodiment, at least one classification may be used during the user's interaction with the chatbot to measure the quality of the chatbot response. For example, the user begins interacting with the chatbot by asking the chatbot the first question. The chatbot may provide an answer. The user may then ask a subsequent question that the chatbot may provide an answer to. Embodiments of the present invention may utilize an algorithm to assess the similarity of words used in the first question and the subsequent question, may compare the intent of the first question with the intent of the second question, or may measure the frustration level of the user during the user's encounter with the chatbot to determine whether the first and subsequent question are similar.

In an embodiment, the first and subsequent questions may be similar to each other if their intent is the same. In an embodiment, the first and subsequent question may also be deemed similar if the questions include words that are similar to each other. For example, the words are synonyms of each other. If it is determined that, based on one or more classifications, the first and the subsequent question asked by the user are similar to each other, then it may be assumed that the chatbot did not provide an accurate answer to the user's first question. By asking the similar second question, the user may be rewording the first question in a slightly different way so that the chatbot may provide an accurate answer. If, however, the user's subsequent question is classified as being different from the first question, then it may be assumed that the subsequent question is not related to the first question. As a result, it may be assumed that the chatbot provided an accurate answer to the first question. In an embodiment, the subsequent question may be classified as being different from the first question if the questions are classified by AI as having different intents, or if the questions do not have many similar words in common.

In an embodiment, measuring the quality of the chatbot responses may be done at the same time as the chatbot is interacting with the user. In an alternative embodiment, measuring the quality of the chatbot responses may be performed using the chatbot's historical logs that may be stored in its database.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and a chatbot quality measurement program 110a. The computer 102 may also be referred to as the client computer. The networked computer environment 100 may also include a server 112 that is enabled to run a chatbot quality measurement program 110b that may interact with a database 114 and a communication network 116. The networked computer environment 100 may include a plurality of computers 102 and servers 112, only one of which is shown. The server 112 may also be a server computer. The communication network 116 may include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the chatbot quality measurement program 110a, 110b may interact with a database 114 that may be embedded in various storage devices, such as, but not limited to a computer/mobile device 102, a networked server 112, or a cloud storage service. The database 114 may store historical chatbot logs. The historical chatbot logs may include questions posed by the user and the corresponding answers provided by the chatbot.

According to the present embodiment, a user using a client computer 102 or a server computer 112 may use the chatbot quality measurement program 110a, 110b (respectively) to measure the quality of a chatbot response. The method of measuring the quality of a chatbot response is explained in more detail below with respect to FIG. 2.

Figure 2:
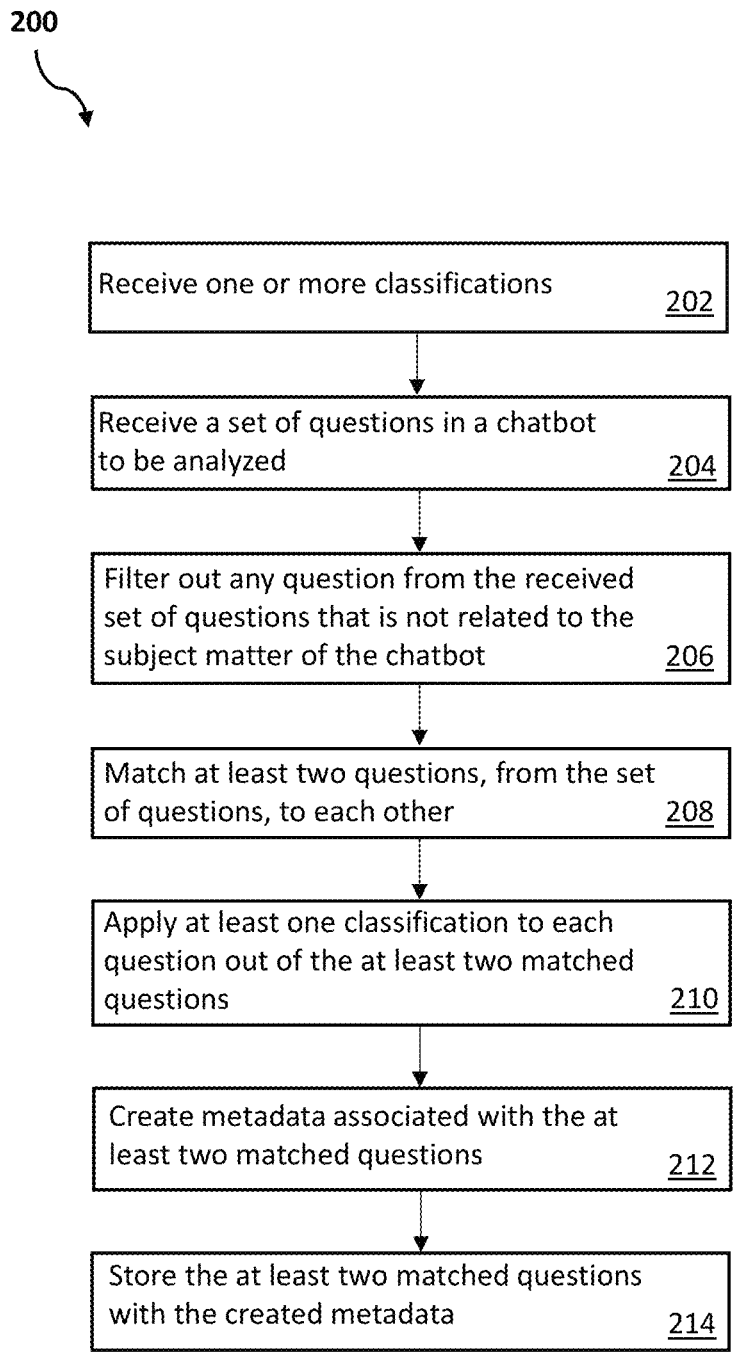
FIG. 2 is an operational flow chart illustrating a process for measuring a quality of a chatbot response, in accordance with an embodiment of the invention.

Referring to FIG. 2, an operational flow chart 200 according to at least one embodiment is depicted. The operational flow chart 200 illustrates measuring the quality of the chatbot response by the chatbot quality measurement program 110a, 110b.

At operation 202, one or more classifications are received. During the development of a chatbot, a chatbot developer may define the classifications and store the classifications in the database 114. Subsequently, when the quality of the chatbot responses are being measured, the chatbot developer may provide these classifications to the chatbot quality measurement program 110a, 110b. Alternatively, the chatbot quality measurement program 110a, 110b may download the classifications from the database 114. The classifications may include, but are not limited to, similarity of words classification, intent of the questions classification, user frustration classification, a window focus based classification (for example, determining whether the user's attention is focused on the chatbot window), or any other classification that may be used to measure the quality of the chatbot responses.

Each of the classifications may include its own classification score. The classification score may be a numeric value that may be calculated when at least two questions, posed by the user, are assessed. The classification score is described in more detail with respect to operation 210.

At operation 204, a set of questions in a chatbot to be analyzed are received. In an embodiment, the quality of the chatbot responses may be measured during the user's interaction with the chatbot. In such a case, the chatbot quality measurement program 110a, 110b may receive a question each time the user poses the question within the chatbot window, in addition to the previous one or more questions posed by the user within that particular chatbot session. For example, the user initiates a chatbot session by asking the following first question: "What is the weather today?" The chatbot provides an answer. The user then asks the following second question: "Is it raining today?" Since the user asked the chatbot two questions, the chatbot quality measurement program 110a, 110b receives both of these questions posed by the user. If the user subsequently asks a third question, then that question will also be included in the set of questions received by the chatbot quality measurement program 110a, 110b.

In an alternative embodiment, a particular time frame may be first defined and then all questions from that particular time frame may be received. The particular time frame may refer to hours, days, weeks, month, or any other time frame define by the chatbot developer. For example, the chatbot quality measurement program 110a, 110b may receive all of questions that were asked the chatbot within a 24 hour time frame. The chatbot quality measurement program 110a, 110b may then separate the questions into one or more set of questions, where each set of questions may represent a particular user interaction with the chatbot.

Referring now to operation 206, the chatbot quality measurement program 110a, 110b may filter out, using AI, any question, from the received set of questions, that is not related to the area of expertise, or the subject matter, of the chatbot. For example, the chatbot is a human resources subject matter expert for a particular company. The set of question received at operation 204 includes twenty questions. Each of the twenty questions may be analyzed, using AI, to determine the intent of each question and whether each question falls within the scope of the subject matter of the chatbot (i.e. human resources). For example, nineteen out of twenty questions pertain to human resource issues, such as, for example, a number of vacation days or number of sick days that an employee may take during a calendar year. However, one question falls outside the scope of the subject matter because it pertains to the weather. As a result, the weather pertaining question may be filtered out from the received set of questions so that only questions relating to the subject matter of the chatbot remain. If there is no intent found in a particular question then it may be assumed that the question falls outside the scope of the subject matter of the chatbot. As a result, any question, whose intent is not classified, may also be filtered out.

Referring now to operation 208, at least two questions, from the filtered set of questions, are matched to each other. As stated above with respect to operation 204, the chatbot quality measurement program 110a, 110b may receive a set of questions from a particular time frame. After the chatbot quality measurement program 110a, 110b filters out any question that is not related to the subject matter expertise of the chatbot, the chatbot quality measurement program 110a, 110b may match at least two questions to each other. Continuing with the example from above, after the filtering step, nineteen questions remain. The nineteen question may be separated into particular subgroups of the subject matter. For example, out of the nineteen questions, two questions pertain to the number of vacation days in a given calendar year, four questions pertain to maternity leave, seven pertain to sick time accruals, and six pertain to worker compensation. The chatbot quality measurement program 110a, 110b may utilize AI and natural language processing to match the questions pertaining to sick days to each other such that the seven questions pertaining to sick time accruals may be matched to each other.

Referring now to operation 210, at least one classification is applied to each of the matched questions. The chatbot quality measurement program 110a, 110b may utilize at least one of the classifications, received at operation 202, to measure the quality of the chatbot responses. As stated above, classifications may include, but are not limited to, assessing the similarity of words used in the first question and the second question, comparing the intent of the first question with the intent of the second question, or measuring the frustration of the user during the user's interaction with the chatbot.

In an embodiment, the chatbot quality measurement program 110a, 110b may utilize an algorithm to compare the questions to each other to determine the number of words the questions have in common. For example, the chatbot quality measurement program 110a, 110b may identify and count the number of words that appear in the questions that are being compared. In this classification, the chatbot quality measurement program 110a, 110b may analyze the questions to determine whether the words used in the questions are synonyms of each other. In an embodiment, the chatbot quality measurement program 110a, 110b may then use the number of words that are the same in the sentences and the number of synonyms used within the sentences to calculate the classification score for this particular classification.

The classification score may be a numeric value such as, for example, from 0 to 10, where 10 may indicate that the questions have most of the words in common and include many synonyms, whereas 0 may indicate that the questions do not have many words in common or contain little or no synonyms. This classification score may be generated by comparing the number of synonyms and the number of the words in common within the compared questions. This classification score may then be used to determine the quality of the chatbot response. For example, the chatbot quality measurement program 110a, 110b receives two questions that were posed by the user during the user's interaction with the chatbot. The two questions are the following: "Will it rain today?" and "Will it drizzle today?" The chatbot quality measurement program 110a, 110b may determine that the two questions have three words in common (will, it, today) and one synonym pair (rain, drizzle). As a result, the chatbot quality measurement program 110a, 110b may determine that the classification score for this particular set of questions is 10 because the two questions include a synonym pair and have many words in common.

In addition to the similarity of words classification, the chatbot quality measurement program 110a, 110b may also apply the intent comparison classification. The chatbot quality measurement program 110a, 110b may utilize the same algorithm to determine the intent of each of the matched question. The intents are then compared to each other to determine whether they match or whether they are different. If the intents between the questions are different, then it may be assumed that the chatbot provided the user with an accurate answer. However, if the intents between the questions is the same, then it may be assumed that the chatbot did not provide the user with an accurate answer and the user rephrased the question in order to get an accurate answer. The chatbot quality measurement program 110a, 110b may then provide a classification score for this particular classification. The classification score for this particular classification may be a numeric value such as, for example, from 0 to 10, where 10 may indicate that the questions have the same intent, whereas 0 may indicate that the questions do not have the same intent. Continuing with the example from above, the chatbot quality measurement program 110a, 110b determines that the intent of the two questions is the same because both questions ask about the state of the weather. As a result, the chatbot quality measurement program 110a, 110b may determine that the classification score for this particular classification is 10. Since the classification score is 10, it may indicate that the chatbot did not accurately answer the user's first question and the user posed the rephrased second question in order to receive an accurate response.

The chatbot quality measurement program 110a, 110b may also conduct sentiment analysis, using know sentiment analysis tools, on each question out of the at least two matched questions to determine the level of user frustration during the user's interaction with the chatbot. Using sentiment analysis, the chatbot quality measurement program 110a, 110b may determine the level of user frustration by analyzing the words and punctuations used by the user. For example, the chatbot quality measurement program 110a, 110b may determine that the user is very frustrated when each subsequent question asked by the user includes more exclamation points and harsher language.

In an embodiment, the chatbot quality measurement program 110a, 110b may also score the user frustration. The score may be a numerical value, such as, for example, from 0 to 10, with 10 indicating that the user is heavily frustrated and 0 indicating that the user is not frustrated. The score may be based on a number of factors such as, for example, the number of exclamation points used in the matched questions or the tone of the words used in the matched questions. For example, the chatbot quality measurement program 110a, 110b matched the following two questions to each other: "Will it rain today?" and "Will it drizzle today!!!!!!!?????" The chatbot quality measurement program 110a, 110b may utilize sentiment analysis to determine that the second question includes seven exclamation points whereas the first question includes none. Because the first question includes no exclamation points, and the second question includes many exclamation points, the chatbot quality measurement program 110a, 110b may determine that the user became frustrated with the chatbot after the chatbot provided a response to the first question. As a result, the chatbot quality measurement program 110a, 110b may quantify the user frustration with a score of 5. If the user asks a third question with additional exclamation points, and the tone of the words changes and become harsher, the chatbot quality measurement program 110a, 110b may determine that the user is even more frustrated than before. As a result, the chatbot quality measurement program 110a, 110b may modify the level of frustration score to 8.

Referring now to operation 212, the metadata associated with the at least two matched questions are created. The metadata may include the user frustration scores for each of the set of questions. The metadata may also include a ratio of the number of similar words and the total number of words used in a given set of at least two matched questions. In addition, the metadata may include information relating to the intents of the at least two matched questions. After the metadata associated with the at least two matched questions is created, this information is stored, at operation 214, in a database, such as, for example, database 114.

It should be appreciated that the chatbot quality measurement program 110a, 110b may generate a report which may provide information as to the overall accuracy of the chatbot. For example, during development, the chatbot developer may set the chatbot accuracy to 70%. That is, if the chatbot answers questions with at least 70% accuracy, then the chatbot is deemed to be accurate. The chatbot quality measurement program 110a, 110b may combine each of the classification scores, generated as a result of the classification of the questions, into an overall accuracy score for that particular chatbot and compare the accuracy score with a predefined chatbot accuracy level to measure the quality of the chatbot response. If the overall accuracy score is lower than the predefined chatbot accuracy level, then it may be assumed that the chatbot's answers are less accurate than expected. As a result, the chatbot developer may wish to adjust the chatbot to increase its accuracy. In an embodiment, if the overall accuracy score is higher than the predefined chatbot accuracy level, then it may be assumed that the chatbot's answers are accurate and adjustments to the chatbot are not necessary. In an alternative embodiment, adjustments to the chatbot may still be made, even if the overall accuracy of the chatbot is higher than the predefined chatbot accuracy level. For example, if one of the classification scores indicates that the chatbot answers are not accurate, the chatbot developer may make targeted adjustments to the chatbot to resolve the accuracy issues associated with that particular classification and classification score.

It should be appreciated that FIGS. 1-2 provide only an illustration of one embodiment and do not imply any limitations with regard to how different embodiments may be implemented. Many modifications to the depicted embodiment(s) may be made based on design and implementation requirements.

Figure 3:
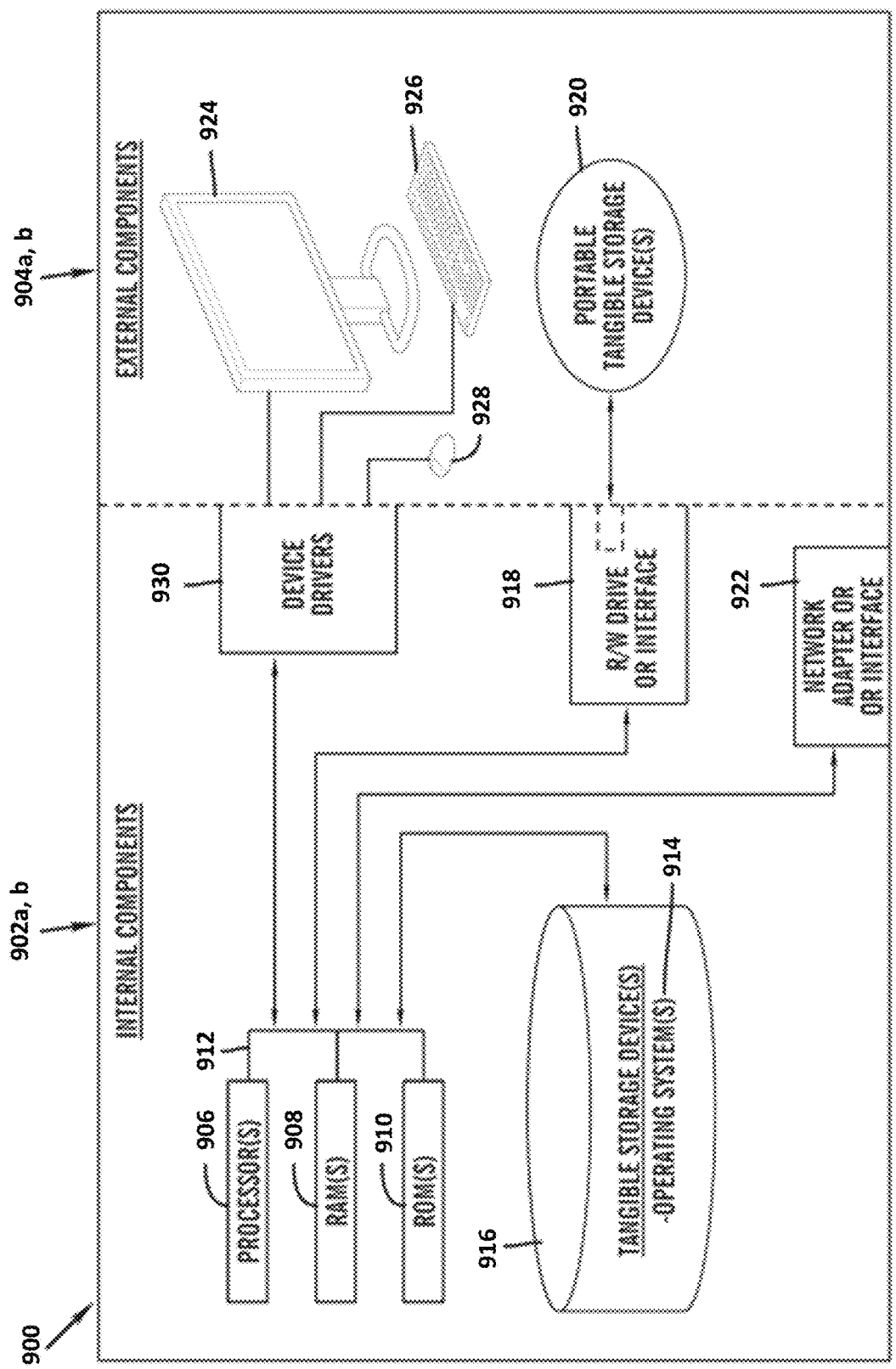
FIG. 3 is a block diagram depicting internal and external components of computers and servers depicted in FIG. 1, in accordance with an embodiment of the invention.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b, and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the chatbot quality measurement program 110a in client computer 102, and the chatbot quality measurement program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a RAY drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the chatbot quality measurement program 110a, 110b can be stored on one or more of the respective portable computer-readable tangible storage devices 920, read via the respective R/W drive or interface 918 and loaded into the respective hard drive.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the chatbot quality measurement program 110a in client computer 102 and the chatbot quality measurement program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the chatbot quality measurement program 110a in client computer 102 and the chatbot quality measurement program 110b in network server computer 112 are loaded into the respective hard drive. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems, or storage. The consumer does not manage or control the underlying web-based or cloud-based infrastructure including databases, corpora, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
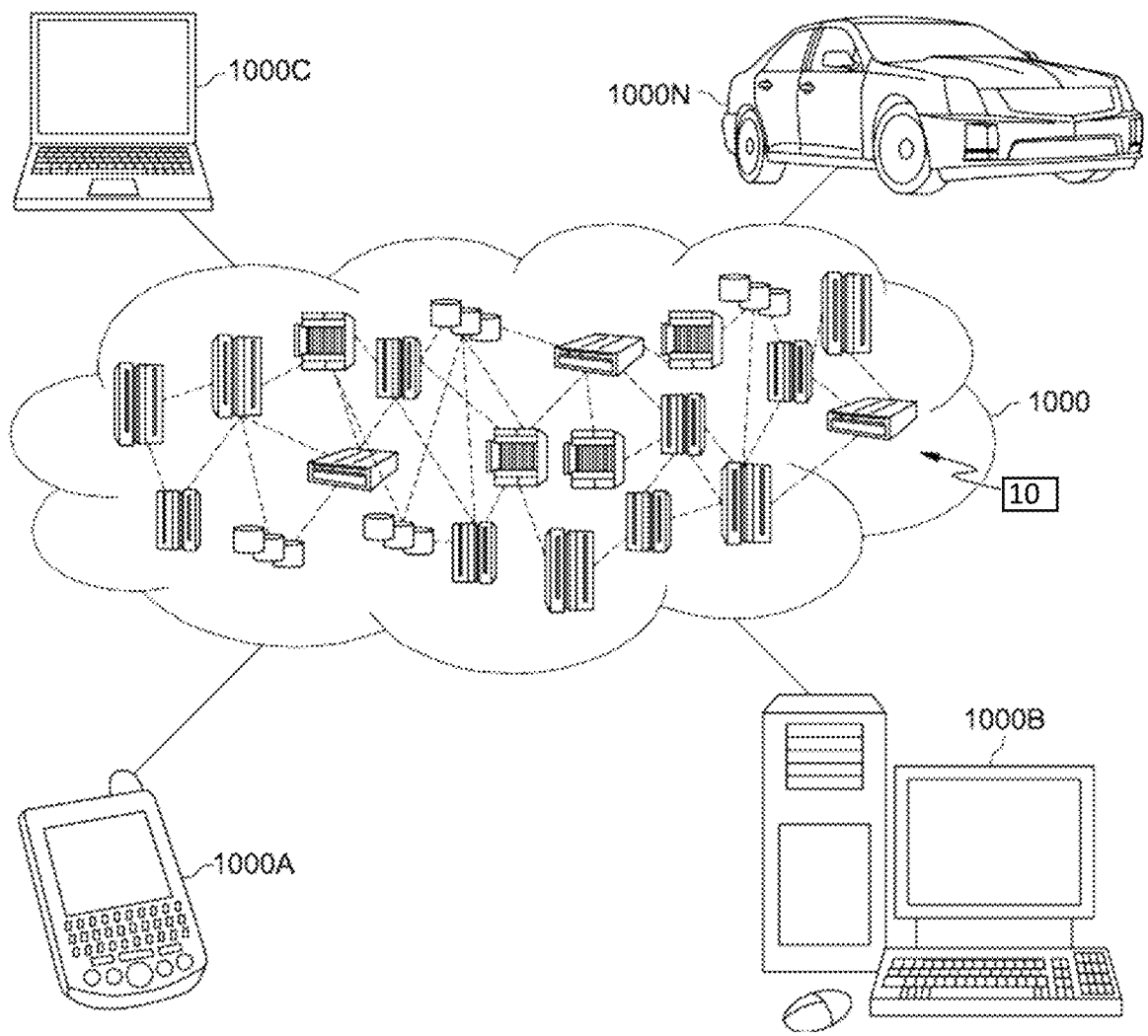
FIG. 4 is a functional block diagram depicting a cloud computing environment including the computer system depicted in FIG. 1, in accordance with an embodiment of the invention.

Referring now to FIG. 4, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 10 and cloud computing environment 1000 can communicate with any type of computerized device over any type of network and/or network addressable connection (e.g., using a web browser).

Figure 5:
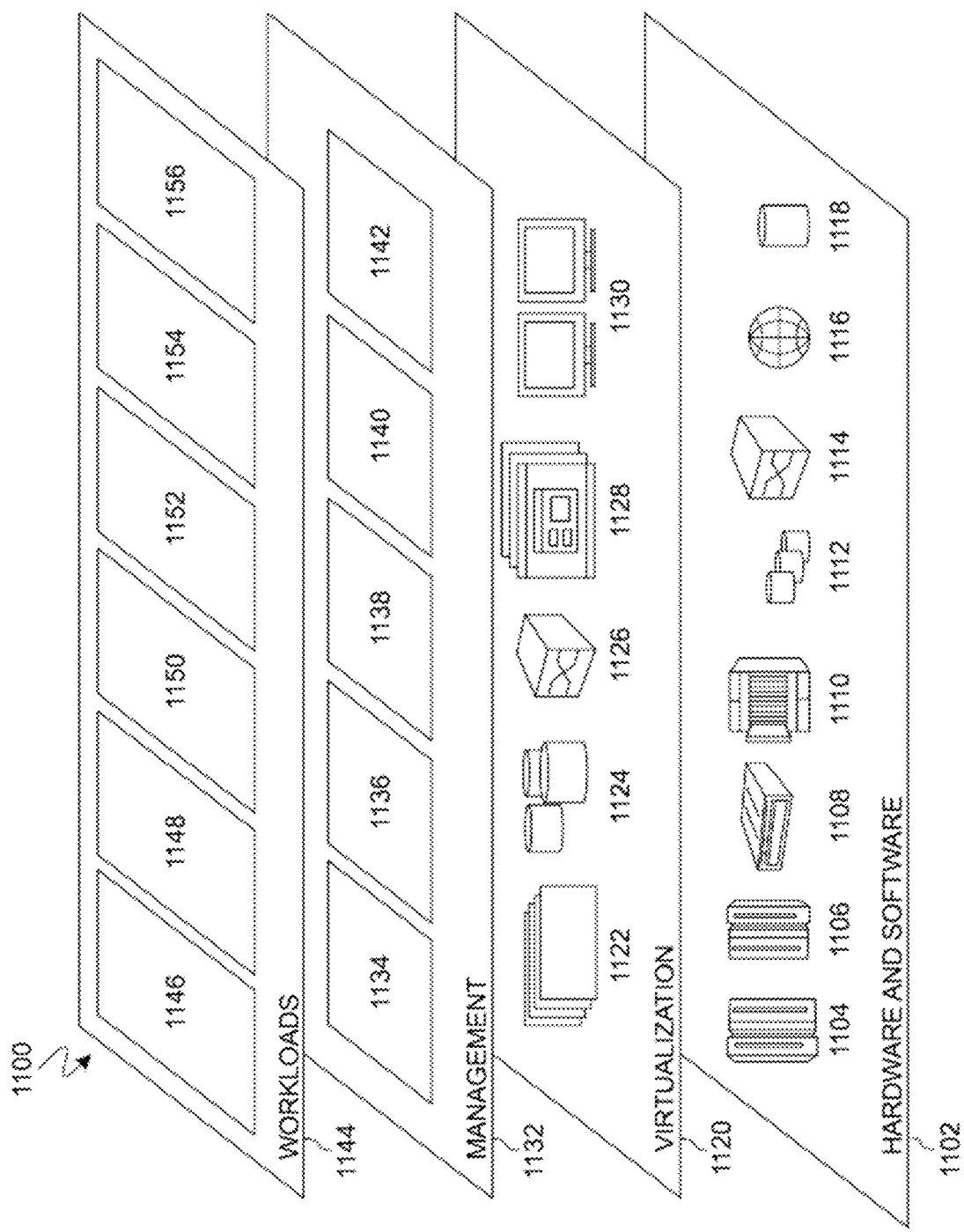
FIG. 5 is a diagram depicting abstraction model layers provided by the cloud computing environment of FIG. 4, in accordance with an embodiment of the invention.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A chatbot quality measurement program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for measuring a quality of a chatbot response, the computer-implemented method comprising:
   receiving one or more classifications;
   receiving a set of questions in a chatbot to be analyzed;
   filtering any question from the received set of questions that is not related to an area of expertise of the chatbot;
   matching at least two questions from the received set of questions to each other; and
   applying at least one of the one or more classifications to the at least two matched questions.

2. The computer-implemented method of claim 1, wherein the one or more classifications is based on a similarity of words and synonyms used in the at least two matched questions.

3. The computer-implemented method of claim 1, wherein the one or more classifications is based on a similarity of intents of the at least two matched questions.

4. The computer-implemented method of claim 1, wherein the one or more classifications is based on a user's frustration associated with the at least two matched questions.

5. The computer-implemented method of claim 1, further comprising:
   creating metadata associated with the at least two matched questions; and
   storing the at least two matched questions with the created metadata.

6. The computer-implemented method of claim 1, wherein the one or more classifications includes a classification score.

7. The computer-implemented method of claim 1, further comprising:
   calculating an overall accuracy of the chatbot;
   comparing the calculated overall accuracy of the chatbot with a predefined chatbot accuracy level; and
   generating an accuracy report.

8. A computer system for measuring a quality of a chatbot response, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving one or more classifications;
   receiving a set of questions in a chatbot to be analyzed;
   filtering any question from the received set of questions that is not related to an area of expertise of the chatbot;
   matching at least two questions from the received set of questions to each other; and
   applying at least one of the one or more classifications to the at least two matched questions.

9. The computer system of claim 8, wherein the one or more classifications is based on a similarity of words and synonyms used in the at least two matched questions.

10. The computer system of claim 8, wherein the one or more classifications is based on a similarity of intents of the at least two matched questions.

11. The computer system of claim 8, wherein the one or more classifications is based on a user's frustration associated with the at least two matched questions.

12. The computer system of claim 8, further comprising:
    creating metadata associated with the at least two matched questions; and
    storing the at least two matched questions with the created metadata.

13. The computer system of claim 8, wherein the one or more classifications includes a classification score.

14. The computer system of claim 8, further comprising:
    calculating an overall accuracy of the chatbot;
    comparing the calculated overall accuracy of the chatbot with a predefined chatbot accuracy level; and
    generating an accuracy report.

15. A computer program product for measuring a quality of a chatbot response, comprising:
    one or more computer-readable tangible storage media and program instructions stored on at least one of the one or more computer-readable tangible storage media, the program instructions executable by a processor to cause the processor to perform a method comprising:
    receiving one or more classifications;
    receiving a set of questions in a chatbot to be analyzed;
    filtering any question from the received set of questions that is not related to an area of expertise of the chatbot;
    matching at least two questions from the received set of questions to each other; and
    applying at least one of the one or more classifications to the at least two matched questions.

16. The computer program product of claim 15, wherein the one or more classifications is based on a similarity of words and synonyms used in the at least two matched questions.

17. The computer program product of claim 15, wherein the one or more classifications is based on a similarity of intents of the at least two matched questions.

18. The computer program product of claim 15, wherein the one or more classifications is based on a user's frustration associated with the at least two matched questions.

19. The computer program product of claim 15, further comprising:
 creating metadata associated with the at least two matched questions; and
 storing the at least two matched questions with the created metadata.

20. The computer program product of claim 15, wherein the one or more classifications includes a classification score.

\* \* \* \* \*